United States Patent Office 3,336,304
Patented Aug. 15, 1967

3,336,304
1,3,4-OXADIAZOLIN-5-ONE DERIVATIVES AND PROCESS FOR THE PREPARATION THEREOF
Hiroshi Nakano, Toyonaka, and Akira Sugihara and Masumi Ito, Osaka, Japan, assignors to Fujisawa Pharmaceutical Co., Ltd., Osaka, Japan, a company of Japan
No Drawing. Filed Jan. 28, 1964, Ser. No. 340,780
2 Claims. (Cl. 260—240)

This invention relates to new and useful 1,3,4-oxadiazolin-5-one derivatives and to process for the preparation thereof.

The compounds of this invention may be prepared by reacting 2-[(5-nitro-2-furyl) mono (or poly) vinyl]-1,3,4-oxadiazolin-5-one with an acylating agent as follows:

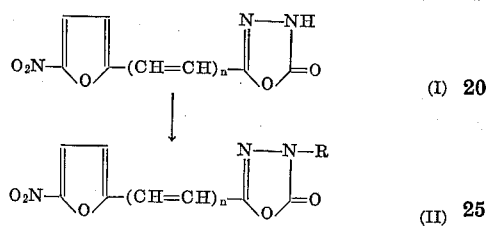

wherein R is an acyl radical and $n$ is 1, 2 or 3.

The starting material used in this invention is obtained, for instance, by the reaction between an aqueous solution of hydrochloric acid salt of (5-nitro-2-furyl) mono (or poly) vinylcarboxylic acid hydrazide and phosgene.

Acylating agents of this invention may be aliphatic, aromatic or heterocyclic carboxylic acid or reactive derivatives thereof, for instance, such as acetic, propionic, butyric, valeric, caproic, lauric, palmitic, phenylacetic, cinnamic, benzoic, nicotinic, isonicotinic, thiophencarboxylic or furoic acid or reactive derivatves thereof and so forth. The agents may be substtuted by radicals not taking part in the reaction such as halogens, nitros, or hydroxys covered by alkyl, aryl or acyl and so forth. The reactive derivatives may be acid halides, acid anhydrides, etc. and also agents such as halogenated carbonic acid ester. In fact, it is more desirable to use the reactive derivatives of the acid than the acid itself. When using an acid halide or a halogenated carbonic ester as the acylating agent, the reaction may be carried out in the presence of a base such as alkali metal carbonate, alkali metal bicarbonate, pyridine, triethylamine and so forth.

The reaction can be carried out with or without a solvent. Examples of solvents are aromatic hydrocarbons such as benzene, toluene, xylene, etc., or inert solvents such as dioxane. An acylating agent or a base in liquid can act also as the solvent. A suitable solvent may be selected with due consideration of the desired reaction temperature. The reaction temperature varies with the acylating agent being used and is not particularly limited.

The compounds thus obtained exhibit a high order of activity against a variety of microorganisms including both Gram-positive and Gram-negative bacteria, fungus such as Trichophyton interdigitale and protozoa such as Trichomonas vaginalis, such activity being measured by conventional methods.

This invention includes within its scope therapeutically useful compositions which comprise one or more of the compounds of this invention together with a significant amount of a non-toxic carrier which may be either a solid material or a liquid. In clinical practice the compounds of this invention will usually be administered by the oral route, in consequence of which the compositions suitable for oral administration are preferable.

Solid compositions for oral administration include tablets, pills, dispersible powder and granules. In such solid compositions one or more of the active compounds is or are admixed with inert diluents such as potato starch, lactose, calcium carbonate and further additional substances, e.g., lubricating compounds. Liquid compositions for oral administration include pharmaceutically acceptable solutions, suspensions and so forth containing inert diluents commonly used in the art. The compositions for oral administration also include capsules of absorbable material such as gelatin containing one or more of the active compounds with or without the addition of diluents or excipients.

The following examples are given solely for the purpose of illustration only and are not to be construed as limitations of this invention, many apparent variations of which are possible without departing from the spirit or scope thereof.

*Example 1*

3.2 g. of 2-[2-(5-nitro-2-furyl) vinyl]-1,3,4-oxadiazolin-5-one are added to 32 cc. of acetic anhydride and heated for 2 hrs. under reflux. After cooling, the precipitated crystals are collected by filtration, washed with water and then recrystallized from 100 cc. of dimethyl formamide. Thus 3.3 g. of yellow crystals of 2-[2-(5-nitro-2-furyl) vinyl]-4-acetyl-1,3,4-oxadiazolin-5-one are obtained, M.P. 243–244° C. (decomp.).

*Analysis.*—Calculated for $C_{10}H_7N_3O_6$: C, 45.29; H, 2.66; N, 15.85. Found: C, 45.60; H, 2.98; N, 16.06.

The activity of this compound is shown in the following table as an example of all the compounds of the invention.

| Microorganisms | Minimum Inhibitory Concentration in mcg./ml. |
|---|---|
| Staphylococus aureus 209 P | 1.56 |
| Staphylococcus aureus Terajima | 12.5 |
| Sarcina lutea PCI 1001 | >100 |
| Bacillus subtilis ATCC 6633 | 0.78 |
| Bacillus subtilis PCI 219 | 12.5 |
| Salmonella typhi 379 | 12.5 |
| Salmonella paratyphi A 51 | 25 |
| Salmonella paratyphi B 113 | 12.5 |
| Salmonella typhimurium S 9 | 25 |
| Salmonella enteritidis | 3.12 |
| Shigella dysenteriae EW 1 | 3.12 |
| Shigella flexneri 2a 3196 | 6.25 |
| Shigella sonnei 1 | 6.25 |
| Klebsiella pneumoniae 0/10 | 25 |
| Proteus vulgaris X 19 | 25 |
| Escherichia coli K-12 | 6.25 |
| Pseudomonas aeruginosa 35 | >100 |
| Vibrio comma 62 | 0.39 |
| Mycobacterium tuberculosis 607 | >100 |
| Streptococcus hemolyticus 68 | 12.5 |
| Streptococcus viridans Yoshizawa | >100 |
| Streptococcus faecalis 5 | 50 |
| Diplococcus pneumoniae I-19 | 3.12 |
| Corynebacterium diphtheriae 92 | >100 |
| Trichophyton interdigitale | 10 |
| Trichomonas vaginalis | 1.25 |

The toxicity of this compound is very low. In mice, the oral $LD_{50}$ is >2400 mg./kg. No difference was recognized between controls and rats taking the compound orally for one month in regard to weight, numbers of blood-corpuscles or the internal organs. The compound is also effective in-vivo. Patients infected with Trichomonas vaginalis were given a capsule each containing 250 mg. in 4 doses daily for a period of 6 to 7 days. Trichomonas vaginalis was not found microscopically in 12 of the 15 patients treated or by culture tests in 9 of the 15 patients. Further, side effects were not appreciable.

*Example 2*

Into a solution of 4.5 g. of 2-[2-(5-nitro-2-furyl) vinyl]-1,3,4-oxadiazolin-5-one in 25 cc. of anhydrous pyridine, 2.1 g. of ethyl chlorocarbonate are dropped during 15 mins. under stirring at 0–5° C. After stirring for an hour at the same temperature, the solution is allowed to stand overnight at room temperature. The reaction solution is poured into ice water and then acidified with 10% hydrochloric acid. The precipitated crystals are collected by filtration, washed with water and then recrystallized from ethyl acetate. Thus 5.0 g. of yellow, fine needles of 2-[2-(5-nitro-2-furyl)vinyl]-4-ethoxycarbonyl-1,3,4-oxadiazolin - 5 - one are obtained, M.P. 193° C.

Analysis.—Calculated for $C_{11}H_9N_3O_7$: C, 44.75; H, 3.07; N, 14.24. Found: C, 44.47; H, 3.27; N, 14.54.

Example 3

4.5 g. of 2-[2-(5-nitro-2-furyl) vinyl]-1,3,4-oxadiazolin-5-one and 1.4 g. of anhydrous potassium carbonate are added to 45 cc. of anhydrous benzene and heated refluxively under stirring. Into the solution, 2.1 g. of ethyl chlorocarbonate are dropped during 50 mins. This solution is heated under reflux while stirring for three hrs. and then cooled. The precipitated crystals are filtered off. (These crystals are the raw material of this example.) The filtrate is washed with diluted hydrochloric acid, then with water and condensed under reduced pressure. Thus 0.1 g. of yellow, fine needles of 2-[2-(5-nitro-2-furyl)vinyl]-4-ethoxylcarbonyl-1,3,4-oxadiazolin - 5 - one are obtained. This substance shows no depression of melting point on admixture with the product obtained in Example 2. Furthermore, the infra-red spectrum of this substance agrees with that of the product of Example 2.

Example 4

To the solution of 2.3 g. of 2-[2-(5-nitro-2-furyl)vinyl]-1,3,4-oxadiazolin-5-one in 23 cc. of anhydrous dioxane, 1.4 g. of anhydrous potassium carbonate are added and heated under reflux while stirring. Into this solution, 1.1 g. of monochloro acetyl chloride are dropped during 10 mins. under heating and then the solution is heated under reflux while stirring for 10 hrs. After cooling, the precipitated crystals are collected by filtration and washed with 10% diluted hydrochloric acid and then with water to remove inorganic substances. The crude crystals are recrystallized from dioxane. Thus 0.2 g. of yellow crystals of 2-[2-(5-nitro-2-furyl)vinyl]-4-chloroacetyl - 1,3,4 - oxadiazoline-5-one are obtained.

Analysis.—Calculated for $C_{10}H_6O_6N_3Cl$: C, 40.08; H, 2.02; N,14.02; Cl, 11.83. Found: C, 39.89; H, 2.19; N, 14.44; Cl, 11.35.

Example 5

4.4 g. of 2-[2-(5-nitro-2-furyl)vinyl] - 1,3,4 - oxadiazolin-5-one and 3.9 g. of propionic anhydride are added to 44 cc. of anhydrous xylene and heated under reflux for 6 hrs. After cooling, the precipitated crystals are collected by filtration and washed with benzene. The crude crystals are recrystallized from benzene or 95% ethanol. Thus 5.0 g. of yellow crystals of 2-[2-(5-nitro-2-furyl)vinyl]-4-propionyl-1,3,4-oxadiazolin-5-one are obtained, M.P. 170–173° C.

Analysis.—Calculated for $C_{11}H_9N_3O_6$: C, 47.32; H, 3.25; N, 15.05; O, 34.38. Found: C, 47.24; H, 3.56; N, 14.79; O, 34.25.

Example 6

3.3 g. of 2-[2-(5-nitro-2-furyl)vinyl]-1,3,4-oxadiazolin-5-one and 4.7 g. of n-caproic anhydride are added to 33 cc. of anhydrous xylene and heated under reflux for 6 hrs. After cooling, the precipitated crystals are collected by filtration and washed with benzene. The crude crystals are recrystallized from benzene. Thus 4.2 g. of yellow needle crystals of 2-[2-(5-nitro-2-furyl)vinyl]-4-n-caproyl-1,3,4-oxadiazolin-5-one are obtained, M.P. 161.5–163° C.

Analysis.—Calculated for $C_{14}H_{15}N_3O_6$: C, 52.33; H, 4.71; N, 13.08. Found C, 52.19; H, 4.90; N, 12.97.

Example 7

1.1 g. of 2-[2-(5-nitro-2-furyl)vinyl]-1,3,4-oxadiazolin-5-one and 1.1 g. of nicotinic anhydride are added to 11 cc. of anhydrous xylene and heated under reflux for 6 hrs. After cooling, the precipitated crystals are collected by filtration and washed with benzene. The crude crystals are recrystallized from dimethyl formamide. Thus 0.7 g. of yellow needles of 2 - [2 - (5 - nitro-2-furyl)vinyl]-4-nicotinoyl-1,3,4-oxadiazolin-5-one are obtained, M.P. 239–240° C. (decomp.).

Analysis.—Calculated for $C_{14}H_8N_4O_6$: C, 51.22; H, 2.46; N, 17.07. Found: C, 50.89; H, 2.66; N, 17.45.

Example 8

2.2 g. of 2-[2-(5-nitro-2-furyl)vinyl]-1,3,4-oxadiazolin-5-one and 1.6 g. of iso-butyric anhydride are added to 30 cc. of anhydrous xylene and heated under reflux for 5 hrs. After cooling, the precipitated crystals are collected by filtration and washed with ether. The crude crystals are recrystallized from 30 cc. of benzene. Thus 2.6 g. of yellow flaky crystals of 2-[2-(5-nitro-2-furyl)vinyl]-4-isobutyloyl-1,3,4-oxadiazolin-5-one are obtained, M.P. 149–151° C.

Analysis.—Calculated for $C_{12}H_{11}O_6N_3$: C, 49.15; H, 3.78; N, 14.33. Found: C, 48.82; H, 3.90; N, 14.47.

Example 9

4.5 g. of 2-[2-(5-nitro-2-furyl)vinyl]1,3,4-oxadiazolin-5-one and 3.0 g. of benzoylchloride are added to 45 cc. of xylene and heated under reflux for 6 hrs. After cooling, the precipitated crystals are collected by filtration and washed with benzene. The crude crystals are recrystallized from chloroform. Thus 5.5 g. of yellow needles of 2-[2-(5-nitro-2-furyl)vinyl]-4-benzoyl - 1,3,4 - oxadiazolin - 5-one are obtained, M.P. 212.5–215° C.

Analysis.—Calculated for $C_{15}H_9O_6N_3$: C, 55.05; H, 2.77; N, 12.84. Found: C, 55.11; H, 2.70; N, 12.75.

We claim:
1. 2 - [2 - (5 - nitro - 2 - furyl)vinyl] - 4 - ethoxycarbonyl-1,3,4-oxadiazolin-5-one.
2. 2 - [2 - (5 - nitro - 2 - furyl)vinyl] - 4 - nicotinoyl-1,3,4-oxadiazolin-5-one.

References Cited

UNITED STATES PATENTS 3,146,232   8/1964   Saikachi et al. _____ 260—240

FOREIGN PATENTS 1,310,114   10/1962   France.

OTHER REFERENCES

Chemical Abstracts, vol. 21, pp. 3199 to 3200 (1927).
Dornow et al.: Chem. Ber. vol. 82, pp. 121 to 123 (1949).

JOHN D. RANDOLPH, Primary Examiner.